United States Patent [19]

Kohama et al.

[11] Patent Number: 5,234,756
[45] Date of Patent: Aug. 10, 1993

[54] SHEET FOR MOLDING FIBER-REINFORCED RESIN

[75] Inventors: Katsumi Kohama; Ryoichi Yugami; Tomohisa Abe, all of Saitama; Kenichi Ueda, Osaka; Yuji Inagaki, Kanagawa; Daisuke Atobe, Fukuoka, all of Japan

[73] Assignees: Honda Giken Kogyo Kabushiki Kaisha, Tokyo; Nippon Shobubai Co., Ltd., Osaka, both of Japan

[21] Appl. No.: 765,745

[22] Filed: Sep. 26, 1991

[30] Foreign Application Priority Data

Sep. 29, 1990 [JP] Japan .................. 2-263504
Sep. 29, 1990 [JP] Japan .................. 2-263505
Sep. 29, 1990 [JP] Japan .................. 2-263506

[51] Int. Cl.⁵ .................................. B32B 15/00
[52] U.S. Cl. ...................... 428/284; 428/285; 428/286
[58] Field of Search ................ 428/284, 285, 286

[56] References Cited

FOREIGN PATENT DOCUMENTS 2-273224 11/1990 Japan .
3-230936 10/1991 Japan .

Primary Examiner—James J. Bell
Attorney, Agent, or Firm—Armstrong, Westerman, Hattori, McLeland & Naughton

[57] ABSTRACT

This invention provides a sheet for molding a fiber-reinforced resin finishing the fiber-reinforced resin moldings surface under an excellently colored condition.

A sheet for molding of this invention comprises a fiber-reinforced resin layer and a colored surface resin layer being laminated and has, in the fiber-reinforced resin layer, a fiber-reinforced colored resin layer adjacent to said surface resin layer and colored in a color similar to that of the surface resin layer, and a fiber-reinforced transparent resin layer arranged on a surface in a side reverse to the surface resin layer and having a curing character by ultraviolet rays.

2 Claims, 5 Drawing Sheets

SHEET FOR MOLDING FIBER-REINFORCED RESIN

BACKGROUND OF THE INVENTION

The present invention relates to a sheet for molding a fiber-reinforced resin and a method for producing it and, in detail, relates to a sheet for molding a fiber-reinforced resin which is used as a material when fiber-reinforced resin products consisting of a thermosetting resin reinforced with glass fiber, carbon fiber, etc. are produced by a sheet-molding method such as a vacuum-molding method etc., and relates to a method for producing the sheet.

In the method for producing the fiber-reinforced resin products, there are a hand lay up method, spray-molding method, metal mold-molding method, vacuum-molding method, pressure-molding method, etc., and among these methods a sheet-molding method such as the vacuum-molding method, pressure-molding method, etc., in which a preproduced sheet for molding a fiber-reinforced resin is used, has been developed as a method which is able to produce a moldings of high precision effectively with relatively with relative simplicity.

FIG. 8 shows an outline of a hitherto-known vacuum-molding method, which comprises using a sheet for molding a fiber-reinforced resin S formed in a sheet type by adding a reinforcing fiber such as glass fiber, carbon fiber, etc. into a liquid type thermosetting resin such as a polyester resin etc., setting this sheet for molding S on a female type (or a male type) mold m, shaping the sheet for molding S along a mold face by absorbing it under vacuum from a vacuum absorbing opening V arranged on the face of mold m, then curing thermally the sheet for molding S by heat transferring from the face of mold m, and thus obtaining a fiber-reinforced resin molding having a desired shape.

In the forementioned method, the covering film C consisting of a thermoplastic resin having a soft and stretching character is stuck on a surface not in contact with the mold face of the sheet for molding S. In shaping by the vacuum absorption, this covering film C is used to prevent air-bubble invasion into a resin material of the sheet for molding S, nap-raising of glass fiber, and uneven irregularities forming on the surface, which may be caused by a pressure difference between both faces of the sheet for molding S.

Also, if a fiber-reinforced resin layer containing glass fiber etc. is exposed on a molding surface, because the flat and smooth character of the surface may be damaged by uneven irregularities caused by glass fiber etc. or feeling of the surface may be bad, a surface resin layer consisting of a composition, which is made by adding an appropriate colorant or others into a thermosetting resin not containing reinforcing fiber, is sometimes laminated on the surface being in contact with the mold face of the sheet for molding S.

However, in the hitherto-known methods described above, there is a problem in a process of thermic curing that the covering film C to cover a surface of the sheet for molding S locally melts and, as a result, the covering film C peels off, the air-bubble invasion into the sheet for molding S is not prevented, the smooth surface can not be fulfilled, and the molding finish becomes bad.

That the covering film C locally melts results from a fact that a thermosetting resin composition of the sheet for molding S causes heat generation during thermic curing, the curing proceeds in advance at a surface layer part adjacent to the covering film C, the heat-convection does not take place at a part where fluidity is lost, so that the heat becomes locally full, the covering film C at this part is led to a high temperature and melts. As a result, the covering film C which has been stretched during the shaping peels off in returning to an original condition. At the point in time that the covering film C has peeled off, if the surface of the thermosetting resin is still liquid or under a softened condition, the thermosetting resin may peel off together with the covering film C, and the aforementioned nap-raising of glass fiber, air-bubble invasion, and surface uneven irregularities takes place.

In an effort to solve this kind of problem, the present inventors previously invented a method which comprises curing by ultraviolet rays irradiation, independent of thermic curing of the whole part, of only a thermosetting resin on a surface layer part of the sheet for molding S adjacent to the covering film C, and they have applied for a patent.

FIG. 9 shows an outline of the forementioned method, which comprises the sheet for molding S being laminated, with the fiber-reinforced transparent resin layer a, in which a transparent thermosetting resin combined with a curing agent by ultraviolet rays is immersed into the glass fiber f, and laminated with the surface resin layer b consisting of only a colored thermosetting resin, but not containing the glass fiber f, and also, which comprises irradiating the sheet for molding S, that is shaped along the mold m, by ultraviolet rays from above the covering film C to cure the surface layer part (the part indicated by a cross mark X in the figure) of the fiber-reinforced transparent resin layer a. By doing like this, it is prevented that the heat generated in thermic curing of the whole part of sheet for molding S becomes full on a part of the surface layer part causing a high temperature condition. Also, even if the covering film C locally melts, nap-raising of glass fiber, air-bubble invasion, etc. do not take place when the surface layer part of the fiber-reinforced transparent resin layer a has been cured.

In this method, it is necessary to keep the fiber-reinforced transparent resin layer a quite transparent in order to absorb ultraviolet rays for curing and also, to laminate the colored surface resin layer b with the fiber-reinforced transparent resin layer a in order to produce a colored molding.

However, in the forementioned preceding art there occurs a problem that, depending upon a shape of the fiber-reinforced resin moldings, the surface resin layer b becomes locally thin, the inside fiber-reinforced transparent resin layer a is seen, the surface color tone is not uniformly finished, uneven color occurs, and outside appearance becomes bad.

This is because, in a case where a projecting portion P exists inside the mold face as shown in FIG. 9, the surface resin layer b is locally and strongly pressed or stretched by the projected portion P so that its thickness becomes thin. The surface resin layer b changes the shape more easily than the fiber-reinforced transparent resin layer a does, because the layer b does not contain the reinforcing fiber, and also, since strain in the molding process concentrates on the surface resin layer b, the surface resin layer b becomes thin. As long as the fiber-reinforced transparent resin layer a is colored in a color same to that of the surface resin layer b, the outside appearance does not become prominent even if the surface resin layer b becomes thin, but when the fiber-reinforced transparent resin layer a is colored, ultraviolet rays are not absorbed, so that curing of the surface layer part is not possible by the forementioned ultraviolet rays irradiation.

SUMMARY OF THE INVENTION

Therefore, an object of the present invention is, as mentioned above, to provide a sheet for molding a fiber-reinforced resin used in a method which comprises sticking a covering film on a surface on a side not in contact with a mold face during a period of shaping, and curing by ultraviolet rays a surface layer part of a fiber-reinforced resin layer adjacent to the covering film, independent of thermic curing of the whole part of the sheet for molding, and to provide a sheet for molding a fiber-reinforced resin capable of finishing the surface of a fiber-reinforced resin moldings under an excellently colored condition. Also, the object is to provide a method for producing a sheet for molding a fiber-reinforced resin of the above type.

The sheet for molding a fiber-reinforced resin fulfilling the above-mentioned object and relating to the present invention is such as being shaped along a face of a mold, thermally cured, and molded. Further, the sheet is laminated with a fiber-reinforced resin layer and a colored surface resin layer and has, in the fiber-reinforced resin layer, a fiber-reinforced colored resin layer which is adjacent to the surface resin layer and colored in a color similar to that of the surface resin layer, and a fiber-reinforced transparent resin layer which is arranged on a side reverse to the surface resin layer and is curable by ultraviolet rays.

Various kinds of thermosetting resins can be freely used as a resin material constituting the sheet for molding a fiber-reinforced resin similarly to the case of common sheet for molding. Practically preferred resins are an unsaturated polyester resin, an epoxy resin, an unsaturated polyurethane resin, an epoxy(meth)acrylate resin, etc. If necessary, various kinds of additives such as a thermic curing agent, a curing agent by ultraviolet rays, an auxiliary curing agent, etc. are combined with the resin material. For example, practically preferred thermic curing agents are, in a case where the resin material is an unsaturated polyester resin, an organic peroxide, a diazo compound, etc.

Practically preferred reinforcing fiber for the resin material is the one similar to the case of a common fiber-reinforced resin and, more practically, are roving, mat, swirl mat, non-woven fabric, etc. consisting of glass, carbon, metal, Kevlar (a trade name of an aramid resin), Tetoron (a trade name of a polyester resin), etc. A fundamental fiber-reinforced resin layer is formed when the liquid resin material is coated or immersed to the reinforcing fiber and shaped to a sheet type. A content of the reinforcing fiber being contained in the fiber-reinforced resin layer, when it becomes larger, the reinforcing effect generally becomes larger, but the shaping becomes difficult. In usual, it is preferred that the fiber content is in a range of from about 10 to 70 weight %.

The surface resin layer may be colored in a specific color by adding various colorants into a resin material as described above, or it may be added with various kinds of additives etc. in order to adjust the surface performance and quality feeling. The colorant used for the surface resin layer has no special limitation as long as it does not disturb a curing character of the resin layer, and various kinds of pigments and dyes can be used and, for example, titanium white (titanium dioxide) is a representative white colorant.

The fiber-reinforced resin layer in the present invention is such one combining a fiber-reinforced transparent resin layer with a fiber-reinforced colored resin layer; the former of which is made by immersing a resin material curable by ultraviolet rays, that is given by combining a curing agent etc. with a transparent resin material, into the aforementioned reinforcing fiber; the latter of which is colored similar to that of the surface resin layer.

In the fiber-reinforced transparent resin layer, a curing agent using ultraviolet rays is containing in addition to a common thermic curing agent. Practical examples of the curing agents using ultraviolet rays, for example, those preferred for an epoxy resin are as follows:

Aryldiazonium salts:
$ArN \equiv NPF_6$
(Ar is an aryl group or a substituted aryl group.)
Diaryliodonium salts:
$Ar_2 I^+ X^-$
(Ar is an aryl group or a substituted aryl group, and $X^-$ is $BF_4^-$, $AsF_6^-$, $PF_6^-$, $SbCl_6^-$, etc.)
Triarylsufonium salt:
$Ar_3 S^+ X^-$
(Ar is an aryl group or a substituted aryl group, and $X^-$ is $BF_4^-$, $AsF_6^-$, $PF_6^-$, $SbCl_6^-$, etc)

The preferred fiber-reinforced colored resin layer is not only such as one colored in a color which is quite similar to that of the surface resin layer, but also such as one colored with a color of the same family or with the same color tone in a range that a color difference between the fiber-reinforced colored resin layer and its circumference part is not prominent, even if the surface resin layer becomes locally thin and the fiber-reinforced colored resin layer on the rear face is seen when a fiber-reinforced resin molding is produced.

The sheet for molding a fiber-reinforced resin is, on a surface of its one side, arranged with the surface resin layer and, adjacent to this surface resin layer, the fiber-reinforced colored resin layer is arranged and, on a surface of the other side, the fiber-reinforced transparent resin layer is arranged and, under these conditions a plural of resin layers are laminated. Between the fiber-reinforced colored resin layer and the fiber-reinforced transparent resin layer, another fiber-reinforced resin layer consisting of a similar resin material or reinforcing fiber may be laminated. That is, if there is at least arranged a fiber-reinforced resin layer, which has the foregoing fiber-reinforced colored resin layer and fiber-reinforced transparent resin layer, and arranged a surface resin layer laminated on a surface of the fiber-reinforced resin layer, any other material layer may be laminated.

It is necessary for the sheet for molding a fiber-reinforced resin of the present invention that the fiber-reinforced transparent resin layer is curable character by ultraviolet rays. Therefore, in a case where the fiber-reinforced transparent resin layer and fiber-reinforced colored resin layer are one another laminated in contact, it should be prevented that a colorant in the fiber-reinforced colored resin layer mingles with the fiber-reinforced transparent resin layer and that, thereby, the curing character of the transparent resin by ultraviolet rays is disturbed. For this, it is also effective to decrease an excess resin in the fiber-reinforced colored resin layer. That is, if a fiber content of the fiber-reinforced colored resin layer is kept at 40% by weight or more, transfer or invasion of a coolant into an adjacent resin layer becomes small and the curing character of the fiber-reinforced transparent resin layer by ultraviolet rays is not disturbed.

A viscosity-thickening treatment on the whole part of the sheet for molding a fiber-reinforced resin is preferred. The sheet thickened in viscosity becomes easy in handling, and also, invasion of the colorant into the fiber-reinforced resin layer during the molding and shaping becomes small and the curing character by ultraviolet rays is not disturbed.

When the sheet for molding a fiber-reinforced resin is used for molding, a covering film is stuck on one face or on both faces of the sheet for molding a fiber-reinforced resin. As a material for the covering film is used various kinds of thermoplastic resin films similar to those used in the common molding methods and, especially, to be able to shape simultaneously with the sheet for molding, one is used having a soft and stretching character as well as not being invaded by a resin material and so on which are contained in the sheet for molding. Practically, nylon, vinylon, polyvinyl alcohol, etc. are cited. Thickness of the covering film may be the same as in a case of the common molding method, but a range of from about 5 to 500 $\mu$m is generally preferred and a range of from about 10 to 100 $\mu$m is more desired. When the covering film is struck on the sheet for molding, it can be stuck only by allowing it to adhere with a surface of the resin layer consisting of a liquid resin material. Also, the sticking is achieved by laminating one by one each of resin layers constituting the sheet for molding on a surface of the covering film. If the covering film is stuck on the sheet for molding, storing and handling of the sheet for molding which contains a liquid resin material become easy and, even if a plural of sheets for molding are laminated, they do not adhere.

The sheet for molding a fiber-reinforced resin relating to the present invention is capable of producing a fiber-reinforced resin molding having an optional shape by a common vacuum molding method, pressure-molding method, etc. and also, capable of freely setting all processes and molding conditions in a molding method, the mold structure, etc.

For example, the mold may be either a female type or a male type. Also, a mold material is usually a metal mold made of steel, aluminum, etc., but a resin mold etc. may be used, too.

When the sheet for molding a fiber-reinforced resin is set on the mold, the surface resin layer is arranged on a mold face side of the mold and the fiber-reinforced transparent resin layer is arranged on the surface on a side which is open and not in contact with the mold face.

Preferable means to shape the sheet for molding along the mold face is a vacuum molding method which comprises shaping a sheet for molding by absorbing it under vacuum from a vacuum absorption opening arranged at the mold, a pressure-molding method which comprises affording a fluid pressure such as air pressure to a side reverse to the mold face of the sheet for molding and pressing onto the mold face followed by shaping the sheet for molding, or a method which uses in combination the vacuum-absorbing and pressure-affording methods, and so on can be adopted.

Preferable means to thermally cure the sheet for molding is a method which comprises having a heater in an inside of the mold, constructing the mold so as to heat it freely, and heating the sheet for molding by heat transfer from the mold face, or a method which comprises heating the whole atmosphere, a method which comprises irradiating ultrared rays, and the other method can be used jointly with the forementioned heating method.

In a case where the sheet for molding a fiber-reinforced resin relating to the present invention is used, at a stage of before the sheet for molding being cured with heating, at least the surface layer part of the fiber-reinforced transparent resin layer has been cured by irradiating by ultraviolet rays the fiber-reinforced transparent resin layer of the sheet for molding. The ultraviolet rays irradiation is carried out by an ultraviolet rays lamp etc.

When the ultraviolet rays irradiation being carried out is set at a proper point, it is in a period which is from pre-shaping of the sheet for molding to complete thermic curing of the sheet for molding. However, the surface layer part should not so excessively be cured as causing impossibility of shaping at a shaping stage of the sheet for molding, and also, the surface layer part of the sheet for molding must be at least half-cured before the covering film melts by progress of the thermic curing of the sheet for molding. Furthermore, since there is a time gap between the ultraviolet rays irradiation and the progress in curing of the surface layer part of the sheet or molding, a period of time of ultraviolet rays irradiation and other irradiating conditions is determined subject to consideration of the aforementioned conditions. Practically, it is possible to initiate the ultraviolet rays irradiation before the shaping process, to carry out the ultraviolet rays irradiation simultaneously with the shaping process, or to carry out the ultraviolet rays irradiation after the shaping process.

It is preferred to stop the curing of the surface layer part by ultraviolet ray irradiation at a stage before complete curing of the surface layer part. This is because, if the surface layer part is completely cured by ultraviolet rays irradiation, curing thermally proceeds by heat transfer from the mold face under a condition of remaining constriction force at the central part and, thus, cracking in an inside of the molding easily occurs. If the surface layer part is not yet completely cured, the constriction force can be relieved. Besides, even though the surface layer part is not completely cured by ultraviolet rays irradiation, this part is finally completely cured in the same manner to the other parts by thermic curing of the whole of the sheet for molding.

Thickness of the surface layer part cured by ultraviolet rays needs not to be over the whole part of the fiber-reinforced transparent resin layer, and the thickness is enough if it is in such a degree that, even if the covering film locally melts by curing-heat generation, air-bubble invasion into an inside of the resin and peeling off of the resin material together with the covering film do not take place. Also, besides the surface layer part being cured by irradiating ultraviolet rays on the whole face of the sheet for molding, the surface layer part may be locally cured by irradiating ultraviolet rays at only a part where the covering film easily melts, as described above.

In the present invention's sheet for molding a fiber-reinforced resin, as described above, in a case where the fiber-reinforced transparent resin layer and fiber-reinforced colored resin layer are one another laminated in contact, it should be prevented that a colorant in the fiber-reinforced colored resin layer mingles with the fiber-reinforced transparent resin layer and that, thereby, the curing character of the transparent resin by ultraviolet rays is disturbed. For this, in producing the sheet for molding, it is effective to carry out viscosity-thickening treatment on any first-laminating resin layer out of the fiber-reinforced transparent resin layer and the fiber-reinforced colored resin layer, before the other layer is laminated. For the viscosity-thickening treatment, a method in which a thickener is beforehand added to a resin material, and a common viscosity-thickening means such as light irradiation, heating, and others are applied.

In molding a sheet for molding a fiber-reinforced resin laminated with the fiber-reinforced resin layer and colored surface resin layer, even if a portion where the surface resin layer has become thin exists depending upon a molding shape, if a fiber-reinforced resin layer colored in a color similar to that of the surface resin layer is arranged adjacent to the surface resin layer, the outside appearance showing the thin surface resin layer is not prominent and the molding surface shows a uniformly colored condition. Since the fiber-reinforced colored resin layer contains reinforcing fiber, even though it is pressed or stretched during a shaping, the thickness does not decrease and the coloring of the surface resin layer is surely reinforced.

Also, if a fiber-reinforced transparent resin layer curable by ultraviolet rays is arranged on a surface in a side reverse to the surface resin layer of the sheet for molding, only the surface layer part of the sheet for molding can be cured, independent of thermic curing of the whole part, by irradiating ultraviolet rays during the shaping on this fiber-reinforced transparent resin layer. As a result, melting and peeling off of the covering film stuck on a surface of the sheet for molding is prevented and excellent finish lacking of air-bubble invasion, nap-raising of reinforcing fiber, uneven irregularities on the surface, and so on is obtained.

If a fiber content of the fiber-reinforced colored resin layer is 40 % by weight or more, a resin content in this resin layer becomes small and, accordingly, since transfer of the resin resulting from the immersing and defoaming operations becomes small during a period of time laminating the next layer, for example, the fiber-reinforced transparent resin layer, transfer and invasion of a colorant from the fiber-reinforced colored resin layer into the fiber-reinforced transparent resin layer becomes none, transparency of the fiber-reinforced transparent resin layer, that is a ultraviolet rays-absorbing character, becomes better and the curing by ultraviolet rays can be done sufficiently.

In producing a sheet for molding a fiber-reinforced resin, a first-laminating resin layer out of the two resin layers, the fiber-reinforced colored resin layer and fiber-reinforced transparent resin layer, has been processed with viscosity-thickening. Thus, for example, if the viscosity-thickening is carried out for the fiber-reinforced colored resin layer, the colorant becomes difficult to transfer, and if the viscosity-thickening is carried out for the fiber-reinforced transparent resin layer, the colorant becomes difficult in invading and, in all cases, transparency of the fiber-reinforced transparent resin layer can be maintained under an excellent condition.

In producing the sheet for molding a fiber-reinforced resin, each of the aforementioned layers may be one by one laminated by a means similar to that used for the usual resin sheet. However, in the second method of the present invention, after the fiber-reinforced transparent resin layer is formed, this layer is not treated with the viscosity-thickening, but on this layer the fiber-reinforced colored resin layer is laminated. The laminating order for each of layers other than the above-described layer can be set freely. In the present invention, except that the fiber-reinforced transparent resin layer and fiber-reinforced colored resin layer are laminated according to the above procedure, in any other process in producing a sheet for molding a fiber-reinforced resin, if necessary, the viscosity-thickening treatment can be carried out at any step on the way of laminating or after completion of the laminating. By doing the viscosity-thickening, laminating operation of each constructing layer and handling of the whole sheet for molding become facile. However, with decreasing number of times of the viscosity-thickening as much as possible, the producing efficiency of the sheet for molding a fiber-reinforced resin becomes high, which is preferable.

In a case where a plural of fiber-reinforced resin layers are laminated, there easily occurs, between upper and lower resin layers, a phenomenon that the first-formed lower resin mingles into the newly laminated upper layer. Accordingly, if the fiber-reinforced colored resin layer is formed and then, on this layer the fiber-reinforced transparent resin layer is laminated, a colorant which is combined with the colored resin layer is transferred and invaded into the fiber-reinforced transparent resin and transparency of the fiber-reinforced transparent resin layer lowers. If the transparency of the fiber-reinforced transparent resin layer lowers, the ultraviolet rays-absorbing character decreases, the curing by ultraviolet rays of the surface layer part can not be sufficiently done, and the forementioned melting and peeling off of the covering film, air-bubble invasion, nap-raising of reinforcing fiber, formation of uneven irregularities on a surface, etc. can not be prevented.

Thus, in the second method of the present invention, the fiber-reinforced transparent resin layer is first formed and then, on this layer the fiber-reinforced colored resin layer is laminated. Doing like this, it is difficult that the resin invades from the later-laminating colored resin layer into the first-formed transparent resin layer, and the possibility that a colorant transfers and invades into the transparent resin layer decreases significantly.

The reason is considered as follows. The resin movement in immersing and defoaming operations for laminating each layer is such that the excess resin in the lower layer (a layer which was already immersed and defoamed) moves to be pushed towards the upper layer being laminated and, therefore, colorant of the fiber-reinforced colored resin layer laminated on the upper layer can not transfer into the lowest layer of the first-laminated fiber-reinforced transparent resin layer (that is a contact face between the fiber-reinforced transparent resin layer and the covering film) and, as a result, the surface layer part curable by ultraviolet rays is sufficiently formed in the fiber-reinforced transparent resin layer.

By the above-described operation, the transparency of the fiber-reinforced transparent resin layer is well secured and the curing by ultraviolet rays of the forementioned surface layer part can be surely carried out. Also, as the viscosity of a resin solution forming a fiber-reinforced transparent resin layer becomes high, the operational effects as described above become high, and this is preferable. Furthermore, if a resin solution having a thixotropic character is used, the operational effects are further enhanced, and it is more preferable. Besides, although there is possibility that the resin comes from the transparent resin layer in the colored resin layer, even if a slight amount of the transparent resin comes in, one need not worry that coloring of the whole part of the colored resin layer becomes light, and the aforementioned covering effect of the surface resin layer due to the fiber-reinforced colored resin layer is not affected.

For producing a sheet for molding a fiber-reinforced resin as described above, each constituting layer may be one by one laminated, but if a surface resin layer is formed on a fiber-reinforced colored resin layer having uneven irregularities on the surface due to reinforcing fiber and having scattering in thickness, the surface resin layer is not formed in uniform thickness and has locally thin portions and also, the reinforcing fiber in the fiber-reinforced colored resin layer may invade an inside of the surface resin layer. Thus, after the sheet for molding is molded, the surface of the surface resin layer, that is the surface of a fiber-reinforced resin molding, may have uneven irregularities, the reinforcing fiber may expose, or unevenness and scattering in surface properties may occur.

Accordingly, in the third method of the present invention, only the surface resin layer is beforehand made and, on this layer, the viscosity-thickening treatment is carried out, and a fiber-reinforced colored resin layer, prepared independently of the surface resin layer, and the surface resin layer are laminated to produce a sheet for molding a fiber-reinforced resin. When doing this, a flat and smooth surface resin layer having uniform thickness can be produced by simply forming the surface resin layer according to a method for forming a common resin single layer, and, if this surface resin layer has been treated with the viscosity-thickening, even if it is laminated with the fiber-reinforced colored resin layer, one need not worry that the thickness becomes ununiform and that the reinforcing fiber invades the surface resin layer.

Besides, in the third method, the fiber-reinforced colored resin layer is laminated on the fiber-reinforced transparent resin layer after formation of this transparent resin layer, also. By doing this, it is difficult that the resin comes for mixing from the later-laminating colored resin layer into the first-laminated transparent resin layer, and the possibility that a colorant comes to and invades the transparent resin layer becomes small.

According to the sheet for molding a fiber-reinforced resin relating to the present invention and mentioned above, because a fiber-reinforced colored resin layer is arranged adjacent to a surface resin layer, even if the surface resin layer locally becomes thin during the shaping process, the colored condition of the molding surface is overall uniform and excellent, and finish which is very superior in the outside appearance is obtained. Besides, since a fiber-reinforced transparent resin layer curable by ultraviolet rays is arranged on a side reverse to the surface resin layer, finish of the surface on this side also becomes excellent. That is, since a covering film is stuck on a surface of the sheet for molding and also, since the surface layer part is cured by ultraviolet rays when shaping, it can be surely prevented that airbubble invasion, nap-raising of fiber, and formation of uneven irregularities occurs, all of which are resulting from peeling off of the covering film during a period of subsequent thermic curing.

As a result of the aforementioned, when the sheet for molding a fiber-reinforced resin relating to the present invention is used, a fiber-reinforced resin molding excellent in the surface finish and superior in quality and properties can be produced.

With respect to a sheet for molding a fiber-reinforced resin, when the fiber content in the fiber-reinforced colored resin layer is arranged in a weight percent of 40 or more, even if a fiber-reinforced transparent resin layer is laminated on a fiber-reinforced colored resin layer, because there is no transfer of a colorant of the colored resin layer into the transparent resin layer, transparency of the fiber-reinforced transparent resin layer is kept in good condition, the aforementioned curing treatment by irradiating ultraviolet rays on the surface layer part of the fiber-reinforced transparent resin layer can be carried out very well and also, finish of the moldings surface becomes excellent.

Besides, in producing a sheet for molding a fiber-reinforced resin, if the viscosity-thickening treatment is carried out on a first-laminating resin layer out of the fiber-reinforced colored resin layer and fiber-reinforced transparent resin layer according to the first method for producing a sheet for molding a fiber-reinforced resin relating to the present invention, it is also possible to prevent the transfer of a colorant of the colored resin layer into the transparent resin layer, and thus, the operational effects similar to the forementioned are cited.

According to the second method for producing a sheet for molding a fiber-reinforced resin relating to the present invention, because the fiber-reinforced transparent resin layer is first formed and then, on this layer, the fiber-reinforced colored resin layer is laminated, a colorant combined with the fiber-reinforced colored resin layer does not come to and invade the surface layer part of the fiber-reinforced transparent resin layer. Therefore, a sheet for molding a fiber-reinforced resin produced here is excellent in the transparency of the fiber-reinforced transparent resin layer, especially, of the surface layer part and also, in an ultraviolet rays-absorbing character, that is curing by ultraviolet rays. In addition, the second method comprises only defining an order for laminating the fiber-reinforced transparent resin layer and fiber-reinforced colored resin layer, so that the producing process and operating time for the whole of sheet for molding a fiber-reinforced resin does not increase. Accordingly, the method is very excellent in productivity and economy.

According to the third method for producing a sheet for molding a fiber-reinforced resin relating to the present invention, since a surface resin layer is at first formed and treated with viscosity-thickening and then laminated with a fiber-reinforced colored resin layer prepared independently of the surface resin layer, a sheet for molding a fiber-reinforced resin obtained here has a surface resin layer having uniform thickness, having not uneven irregularities on the surface, and being flat, and the sheet for molding shows no invasion of reinforcing fiber into the surface resin layer. Besides, since the fiber-reinforced transparent resin layer is at first formed and then, on this layer, the fiber-reinforced colored resin layer is laminated, there is no chance that a colorant combined with the fiber-reinforced colored resin layer comes to and invades the surface layer part of the fiber-reinforced transparent resin layer. Accordingly, a produced sheet for molding a fiber-reinforced resin is excellent in transparency of the fiber-reinforced transparent resin layer, especially, of the surface layer part and very superior in absorption of ultraviolet rays, that is the curability by ultraviolet rays.

DESCRIPTION OF THE PREFERRED EMBODIMENTS

The present invention is hereinafter explained by the figures showing examples being referred.

Figure 1:
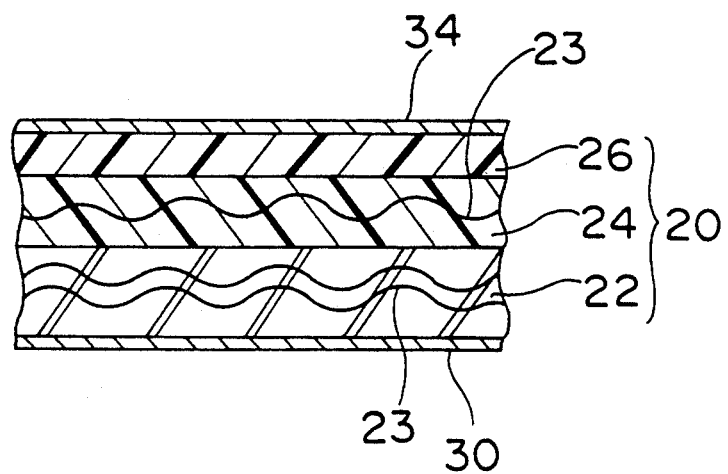
FIG. 1 is a cross-sectional view of a sheet for molding a fiber-reinforced resin relating to an example of the present invention.

FIG. 1 shows a sectional view where that covering films are stuck on a sheet for molding a fiber-reinforced resin. In order to constitute a desired surface of a molding, the sheet for molding a fiber-reinforced resin 20 is laminated in sequence with a surface resin layer 26 processed with a specific coloring, with a fiber-reinforced colored resin layer 24 made by immersing a thermosetting resin such as an unsaturated polyester resin etc., which is colored in a color similar to that of the surface resin layer 26, into a reinforcing fiber 23 such as a glass fiber etc., and with a fiber-reinforced transparent resin layer 22 made by immersing a transparent thermosetting resin, to which a curing agent using ultraviolet rays is combined, into the reinforcing fiber 23. On both sides of the sheet for molding a fiber-reinforced resin 20, covering films 30 and 34 made of a vinylon film etc. are stuck. The covering film 34 on the surface resin layer 26 may be omitted, although it is effective to facilitate protection and handling of the sheet for molding 20 or to facilitate taking off of a mold.

A method as shown in FIG. 3(a) to 3(c) for producing a sheet for molding a fiber-reinforced resin 20 may comprise laminating on the covering film 30 in sequence the fiber-reinforced transparent resin layer 22, the fiber-reinforced colored resin layer 24, and the surface resin layer 26, and, on the layer 26, sticking the covering film 34, or comprise inversely laminating on the covering film 34 the surface resin layer 26, the fiber-reinforced colored resin layer 24, and the fiber-reinforced transparent resin layer 22, and, on the layer 22, sticking the covering film 30.

If the content of a reinforcing fiber in the fiber-reinforced colored resin layer 24 is raised up to 40% by weight or more, a colorant of the colored resin layer 24 can be effectively stopped from transferring into the transparent resin layer 22. Also, in a case where the fiber-reinforced transparent resin layer 22 is laminated on the fiber-reinforced colored resin layer 24, if the colored resin layer 24 is enriched in viscosity and laminated with the transparent resin layer 22, a similar effect can be obtained.

According to the method in which, on the covering film 30, the fiber-reinforced transparent resin layer 22, the fiber-reinforced colored resin layer 24, and the surface resin layer 26 are one by one laminated, it is not necessary to beforehand carry out the viscosity-thickening treatment on the fiber-reinforced transparent resin layer 22.

Figure 2:
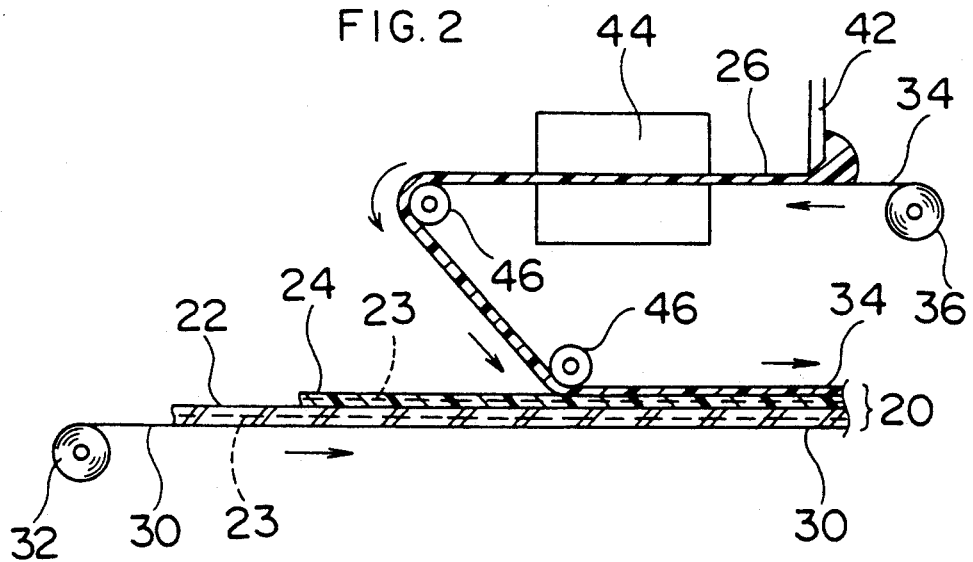
FIG. 2 is a structural view of an outline showing one example of a device for producing a laminated sheet.
Figure 3:
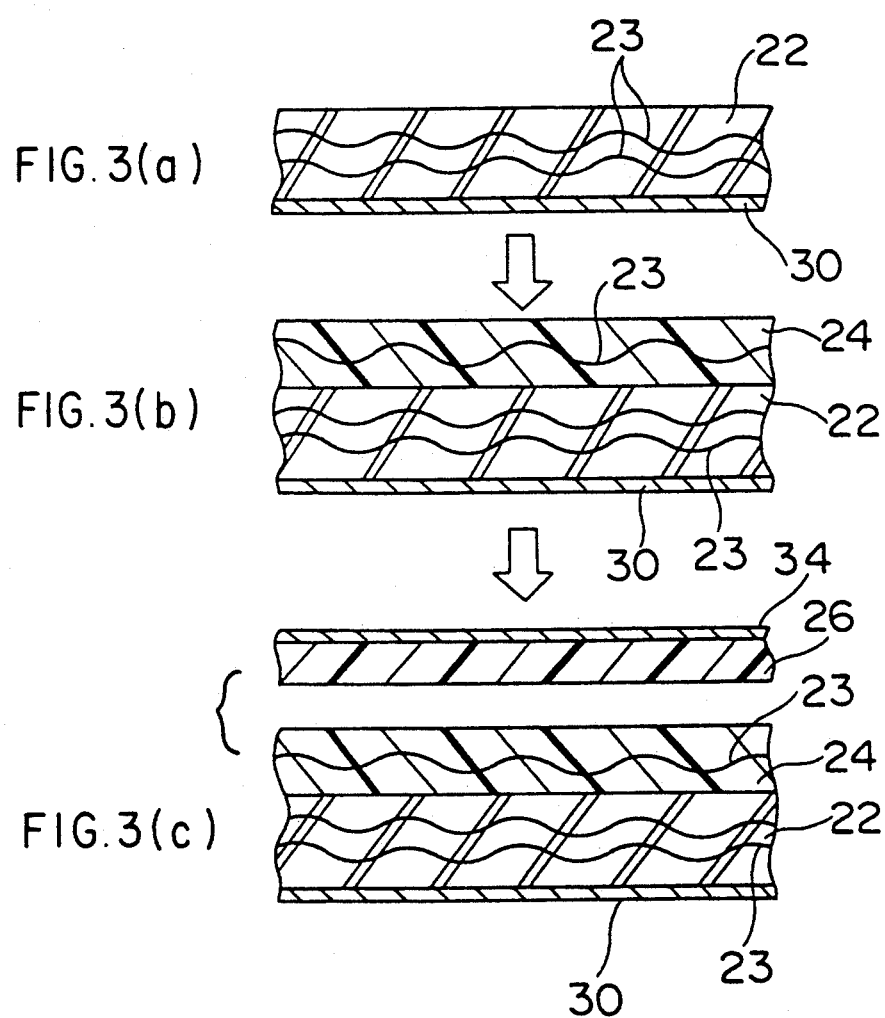
FIGS. 3(a) to 3(c) is a cross-sectional view showing stepwise a process for producing a laminated sheet.

FIG. 2 shows one example of a device, relating to the third production method, for producing the sheet for molding 20 equipped with such a laminated structure as described above. FIG. 3 shows stepwise a process such production.

First, in FIG. 2, with pulling out in sequence the covering film 30 kept on the winding roll 32 and with running it, the fiber-reinforced transparent resin layer 22 is formed as a layer on the covering film 30 by supplying the reinforcing fiber 23 and a transparent resin curable by ultraviolet rays [refer to FIG. 3(a)]. Next, the fiber-reinforced colored resin layer 24 is formed as a layer by supplying the reinforcing fiber 23 and a colored resin to which specially defined coloring is given [refer to FIG. 3(b)]. Like this, when the fiber-reinforced transparent resin layer 22 is at first formed and then, on this layer, the fiber-reinforced colored resin layer 24 is formed, even if the viscosity-thickening treatment is not carried out on the fiber-reinforced transparent resin layer 22, there is no possibility that a colorant of the colored resin layer 24 transfers to the surface layer part of the transparent resin layer 22.

Next, above the running position of the aforementioned covering film 30, the covering film 34 which has been kept on another winding roll 36 is pulled out and run in a direction opposite to that of the aforementioned covering film 30. A resin material treated with specially defined coloring is supplied on the covering film 34 and stretched with pulling in a defined thickness by using a thickness-controlling member 42 such as a doctor knife etc., whereby the surface resin layer 26 is formed as a layer. The covering film 34 and surface resin layer 26 are treated with the viscosity-thickening using the viscosity-thickening furnace 44 and then, the running direction is reversed along the guide rolls 46 and 46. When the running direction is reversed, the condition is such that the surface resin layer 26 attaches to a lower face of the covering film 34. When the upper and lower covering films 30 and 34 are run in an identical direction so that the surface resin layer 26 overlaps with the fiber-reinforced colored resin layer 24 [refer to FIG. 3(c)], the sheet for molding a fiber-reinforced resin 20, in which the surface resin layer 26, the fiber-reinforced colored resin layer 24, and the fiber-reinforced transparent resin layer 22 were laminated in sequence, is completed and the condition is such that the covering films 30 and 34 are stuck on both faces of the sheet for molding a fiber-reinforced resin 20.

According to the producing method in the above-described example, since the surface resin layer 26 is formed as a layer on the covering film 34, the surface resin layer 26 having a flat and uniform thickness can be formed and the appearance and surface properties of moldings become excellent. Since the surface resin layer 26 is thickened in viscosity and then, laminated with the fiber-reinforced colored resin layer 24, one need not worry that the reinforcing fiber 23 in the fiber-reinforced colored resin layer 24 comes to and mingles with the surface resin layer 26 side. Since the fiber-reinforced transparent resin layer 22 is at first formed as a layer and then, on this layer, the fiber-reinforced colored resin layer 24 is formed as a layer, there is no possibility that the colorant of the colored resin layer 24 transfers to the surface layer part of the transparent resin layer 22.

As a method for producing the sheet for molding a fiber-reinforced resin 20, in addition to the above-described methods, there can be applied a method which comprises forming the surface resin layer 26 on a flat surface of a proper film, or other than the covering film 34, and viscosity-thickening and then laminating the layer 26 on the side of the fiber-reinforced colored resin layer 24.

Next, a molding method of the sheet for molding a fiber-reinforced resin 20 produced like the above is explained.

Figure 4:
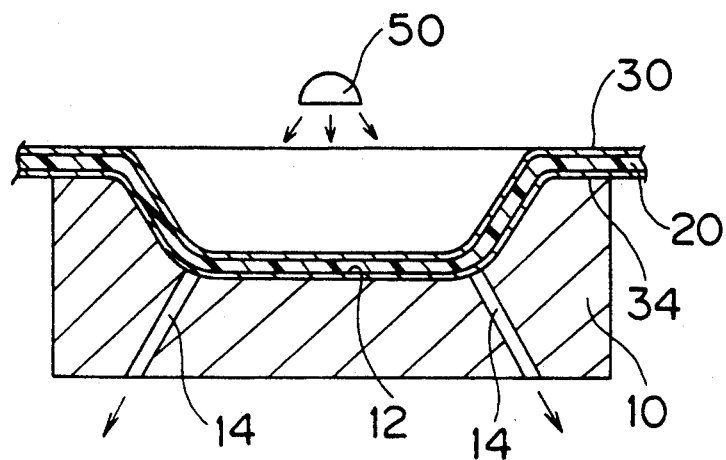
FIG. 4 is a cross-sectional view of an outline showing a method for molding a laminated sheet.
Figure 6:
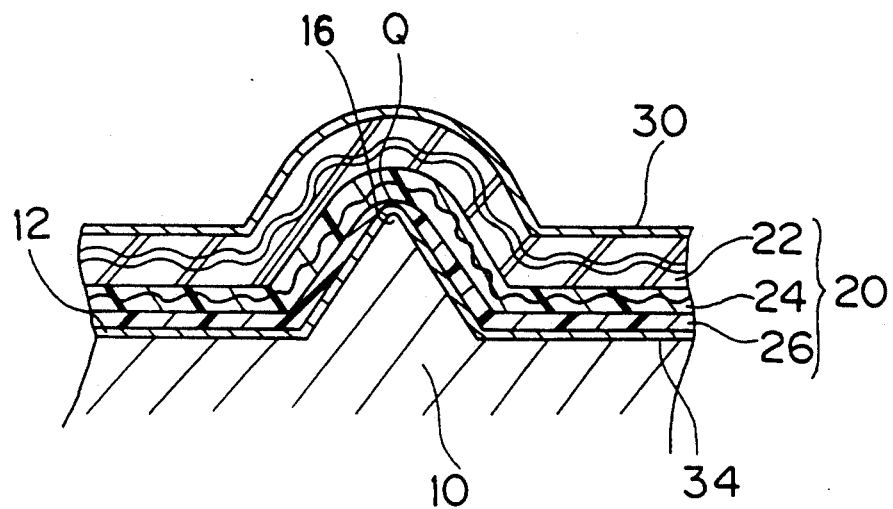
FIG. 6 is a cross-sectional view of a part where the surface resin layer has become thin.

FIG. 4 shows a molding condition. The molding is carried out by arranging on the mold 10 the sheet for molding a fiber-reinforced resin 20 stuck with the covering films 30 and 34, absorbing the sheet under vacuum from a vacuum absorption opening 14, pulling the sheet for molding 20 and covering films 30 and 34 into a mold, and shaping it along the mold face 12. The sheet for molding 20, when it comes in contact with the mold face 12, initiates thermic curing by heat transfer from the mold face 12. As shown in FIG. 6, in a case where a projecting part 16 exists on the mold surface 12, the surface resin layer 26 is pressed or stretched and becomes locally thin at a top of the projecting part 16. However, there exists in an inside of the surface resin layer 26 the fiber-reinforced colored resin layer 24, which does not become thin and maintains a sufficient thickness because of the existing reinforcing fiber 23.

Figure 5:
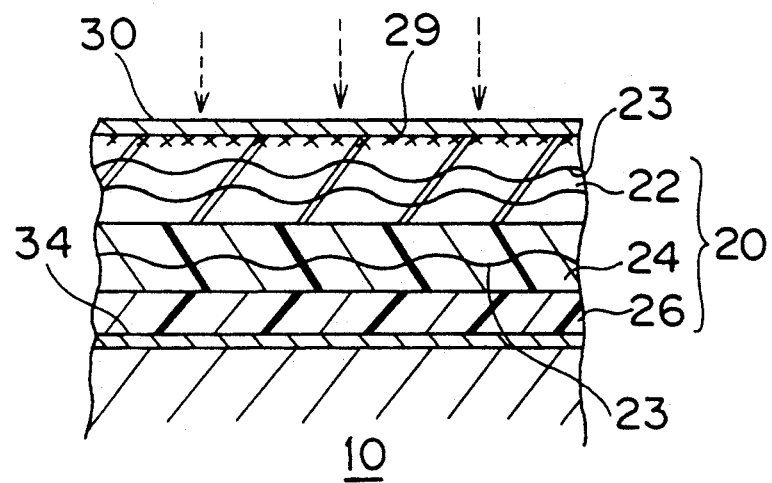
FIG. 5 is an enlarged cross-sectional view of an important portion of the shaping process.

As shown in FIG. 5, by radiating an ultraviolet rays lamp 50, the surface layer part 29 (indicated with a cross mark x in the figure) of the fiber-reinforced transparent resin layer 22 on a side reverse to the mold face 12 in the sheet for molding 20 is cured by ultraviolet rays. At this stage, thermic curing of the whole part of the sheet for molding 20 by heat transfer from the side of mold face 12 it is not in a very advanced condition, and heat generation accompanied with the thermic curing is not so much as to cause melting of the covering film 30.

After irradiation of an ultraviolet rays lamp 50 is finished, through a common thermic curing process, the whole part of the sheet for molding 20 is cured. At this stage, although there is a case where the covering film 30 locally melts by heat generation accompanied with the thermic curing, such a problem as hitherto reported does not take place because the above-described surface layer part 29 of the sheet for molding 20 has already cured.

Figure 7:
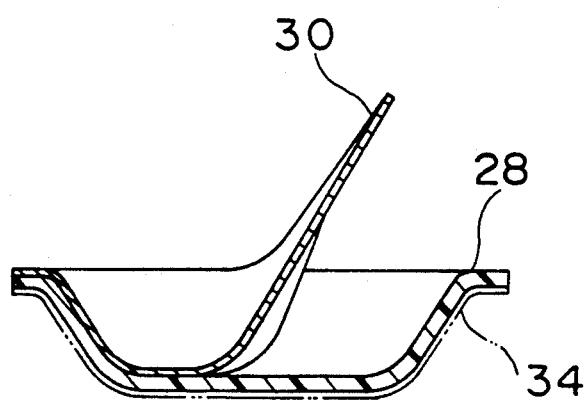
FIG. 7 is a cross-sectional view of a molding obtained.
Figure 8:
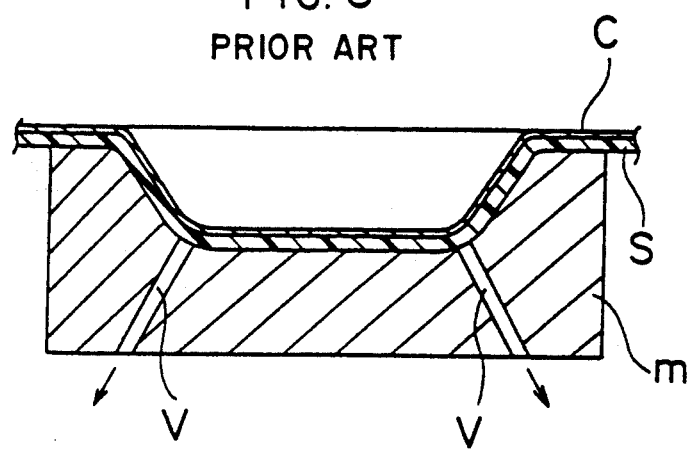
FIG. 8 is a cross-sectional view showing a molding state in a hitherto-known prior art example.
Figure 9:
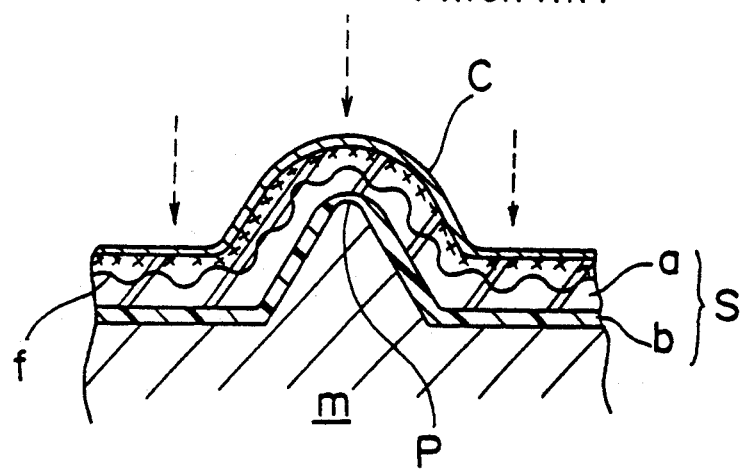
FIG. 9 is an enlarged cross-sectional view of an important portion of a prior art example.

After the resin materials in all the layers were already thermally cured and the sheet for molding 20 was shaped in a desired shape, the sheet for molding 20 and covering films 30 and 34 are taken out from the mold 10 and, by carrying out a specified trimming and outside-processing, a fiber-reinforced resin molding 28 such as shown in FIG. 7 is obtained. The covering films 30 and 34 stuck on a surface of the sheet for molding 20 may be peeled off from a surface of the molding 28.

Even if the molding 28 thus-obtained, as shown in FIG. 6, has a portion Q where the surface resin layer 26 becomes locally thin by shape-change in the course of molding, because the portion Q is sufficiently covered by the fiber-reinforced colored resin layer 24 which has been set on the rear side of the surface resin layer 26, the molding 28 has a condition that the whole surface is uniformly colored in the outside appearance and has good finish. Besides, because the surface of the fiber-reinforced transparent resin layer 22 on the side reverse to the surface resin layer 26 is also covered by the covering film 30 during the shaping and, because the surface layer part 29 has been cured by ultraviolet rays, flat and smooth as well as excellent finish which does not involve air-bubble invasion, nap-raising of reinforcing fiber, and uneven irregularities is obtained.

Next, practical production of a sheet for molding a fiber-reinforced resin relating to the present invention and results of evaluated molding properties are explained.

In the examples [%] means [weight %], unless otherwise state.

| Using Material and Mold | |
|---|---|
| <Resin solution for surface resin layer> | |
| Unsaturated polyester resin (EPOLAC N-325, made by Nippon Shokubai Co., Ltd.) | 100 parts by weight |
| Titanium white | 10 parts by weight |
| Anhydrous silicic acid, fine powder | 2 parts by weight |
| Styrene | 15 parts by weight |
| Thickening agent (magnesium oxide) | 1 part by weight |
| Thermic curing agent (tertiary-butylperoxy 2-ethylhexanoate) | 1 part by weight |
| <Resin solution for fiber-reinforced colored resin layer> | |
| Unsaturated polyester resin (EPOLAC G-103, made by Nippon Shokubai Co., Ltd.) | 100 parts by weight |
| Titanium white | 10 parts by weight |
| Thickening agent (magnesium oxide) | 1 part by weight |
| Thermic curing agent (tertiary-butylperoxy 2-ethylhexanoate) | 1 part by weight |
| <Resin solution A for fiber-reinforced transparent resin layer> | |
| Unsaturated polyester resin (EPOLAC G-103, made by Nippon Shokubai Co., Ltd.) | 100 parts by weight |
| Styrene | 15 parts by weight |
| Thickening agent (magnesium oxide) | 1 part by weight |
| Thermic curing agent (tertiary-butylperoxy 2-ethylhexanoate) | 1 part by weight |
| Curing agent using ultraviolet rays (benzoin methyl ether) | 1 part by weight |
| Viscosity of the combined resin solution = 1.2 poises | |
| <Resin solution B for fiber reinforced transparent resin layer> | |
| Unsaturated polyester resin (EPOLAC G-103, made by Nippon Shokubai Co., Ltd.) | 100 parts by weight |
| Thickening agent (magnesium oxide) | 1 part by weight |
| Thermic curing agent (tertiary-butylperoxy 2-ethylhexanoate) | 1 part by weight |
| Curing agent using ultraviolet rays (benzoin methyl ether) | 1 part by weight |
| Viscosity of the combined resin solution = 6.7 poises | |
| <Resin solution C for fiber-reinforced transparent resin layer> | |
| Unsaturated polyester resin (EPOLAC G-103, made by Nippon Shokubai Co., Ltd.) | 100 parts by weight |
| Styrene | 13 parts by weight |
| Anhydrous silicic acid, fine powder | 1 part by weight |
| Thickening agent (magnesium oxide) | 1 part by weight |
| Thermic curing agent (tertiary-butylperoxy 2-ethylhexanoate) | 1 part by weight |
| Curing agent using ultraviolet rays (benzoin methyl ether) | 1 part by weight |
| Viscosity of the combined resin solution = 5.5 poises | |
| Thixotropic index of the combined resin = 2.3 | |
| <Reinforcing fiber> | |
| Glass fiber mat (MC-450A, made by Nitto Boseki Co., Ltd.) | |
| <Covering film> | |
| Vinylon film (thickness 30μ) | |
| <Mold> | |

A mold of a female type, which has an opening hole part of 600×150 mm, 75 mm deepness, an air-exhausting opening in an inside, and further, has a projection of the undermentioned shape along the lengthwise direction. A cross-sectional view of the projection is an isosceles triangle having a top angle of 90° and height of 10 mm and has roundness of 10 mm curvature radius at the top. A cavity corresponding to this projection is formed on the moldings.

EXAMPLE 1

The covering film 34 was stuck on a flat and smooth stand, spacers consisting of a silicon rubber belt of thickness 1 mm and width 10 mm were placed on both the terminal ends, then the resin solution for a surface resin layer was supplied between the spacers, a glass rod laid across on the spacers was transferred along the spacers to make a surface of the resin solution flat and to remove an excess of the resin solution, whereby a surface resin layer 26 was formed. After viscosity-thickening at 40° C. for 3 hours, a fiber-reinforced colored resin layer 24 showing a glass content of about 40% was formed using one sheet of glass fiber mat and the resin solution for a fiber-reinforced colored resin layer. Next, at once, using two sheets of glass fiber mats and the resin solution B for a fiber-reinforced transparent resin layer, a fiber-reinforced transparent resin layer 22 showing a glass content of about 30% was laminated. Furthermore, on this, to facilitate defoaming, a small amount of resin solution B for a fiber-reinforced transparent resin layer was supplied, a covering film 30 was covered, and the defoaming treatment was carried out with a roller. Laminating of all the layers was carried out using a ditch-cutting, defoaming roller, according to an usual procedure. The whole part of laminated sheets thus-obtained was matured with warming at 40° C. for 12 hours, whereby a fiber-reinforced resin sheet for molding 20 was produced. The condition of this obtained sheet for molding 20 was such that the surface resin layer 26 of a beautifully colored condition appeared on one side and that the fiber-reinforced transparent resin layer 22 of a good transparent condition appeared on the reverse side. In between, there exists the fiber-reinforced colored resin layer 24, from which transference of a colorant to a surface layer part of the fiber-reinforced transparent resin layer 22 was not found.

Next, the sheet for molding a fiber-reinforced resin 20 was shaped. This sheet 20 was set at the opening hole part of the mold 10 kept at 90° C. so as to place the side of surface resin layer 26 on the side of the mold face 12, the circumference was fixed, the inside was exhausted under vacuum, the sheet 20 was absorbed into the mold to carry out shaping, and it was immediately irradiated with ultraviolet rays for 90 seconds using an ultraviolet rays lamp. At 20 minutes after shaping, when the mold was taken off and the covering films 30 and 34 on both the sides were peeled off, the obtained molding 28 did not show any air-bubble invasion and undesired uneven irregularities, had an appearance which is flat and smooth and has a uniform color tone, and also, was superior in strength on both faces.

EXAMPLE 2

The procedure of example 1 was repeated except that the glass content of the fiber-reinforced colored resin layer 24 was changed to 30%, the viscosity-thickening treatment was carried out at 40° C. for 3 hours after the fiber-reinforced colored resin layer 24 was formed, and then the fiber-reinforced transparent resin layer 22 was laminated, whereby the sheet for molding a fiber-reinforced resin 20 was produced. Conditions of the sheet for molding 20 thus-obtained were excellent as in the example 1.

The molding of sheet for molding 20 was carried out similarly to that in the example 1 except that a period of time for irradiating ultraviolet rays was changed to 50 seconds, and a molding having good finish was obtained similarly to the case of example 1.

EXAMPLE 3

A covering film 34 stuck on a mold frame was placed on a flat and smooth stand such that the stand and film were in contact, and spacers consisting of a silicon rubber belt of thickness 1 mm and width 10 mm were arranged at both the terminal ends on the film. Next, the resin solution for a surface resin layer was supplied on the covering film 34 between the spacers, and then, a glass rod laid across on the spacers was transferred along the spacers to remove an excess resin solution, whereby the surface resin layer 26 was formed. Furthermore, by thickening viscosity at 40° C. for 3 hours, a sheet consisting of the covering film 34 and the surface resin layer 26 thickened in viscosity was beforehand arranged.

On the other hand, on another covering film 30, using two sheets of glass fiber mats and the resin solution B for a fiber-reinforced transparent resin layer, a fiber-reinforced transparent resin layer 22 showing a glass content of about 30% was formed and subjected to viscosity-thickening at 40° C. for 3 hours. Next, on this, using one sheet of glass fiber mat and a resin solution for a fiber-reinforced colored resin layer, the fiber-reinforced colored resin layer 24 showing a glass content of about 30% was laminated. This laminating was carried out in an usual method using a ditch-cutting, defoaming roll.

Next, to facilitate defoaming, a small amount of resin solution for a fiber-reinforced colored resin layer was supplied on the fiber-reinforced colored resin layer 24. Furthermore, on this, paying attention so as to allow no air-invasion, the beforehand-arranged sheet consisting of the covering film 34 and the viscosity-thickened surface resin layer 26 was put so that the viscosity-thickened surface resin layer 26 is in the side of the fiber-reinforced colored resin layer 24, and then, excess resin was removed by a roll. Then, the whole laminated sheet obtained was matured at 40° C. for 12 hours to produce the sheet for molding a fiber-reinforced resin 20. Conditions of the sheet for molding 20 thus-obtained were excellent similarly to the case of example 1.

The shaping of sheet for molding 20 was carried out similarly to that in the example 1 except that a period of time for irradiating ultraviolet rays was changed to 50 seconds, and a molding having good finish was obtained similarly to the case of example 1.

EXAMPLE 4

Using two sheets of glass fiber mats and the resin solution A for a fiber-reinforced transparent resin layer, the fiber-reinforced transparent resin layer 22 having a glass content of about 30% was formed on the covering film 30. On this layer, using one sheet of glass fiber mat and the resin solution for a fiber-reinforced colored resin layer, the fiber-reinforced colored resin layer 24 having a glass content of about 30% was immediately laminated.

Next, the viscosity-thickening treatment was carried out at 40° C. for 3 hours, and then, spacers consisting of a silicon rubber belt of thickness 1 mm and width 10 mm were set on both the terminal ends of the upper face of the fiber-reinforced colored resin layer 24. After the resin solution for the surface resin layer is supplied on the fiber-reinforced colored resin layer 24 between the spacers, a glass rod laid across on the spacers is transferred along the spacers to make the resin solution surface flat and to remove an excess of the resin solution, whereby the surface resin layer 26 was formed. The laminated sheet thus-obtained was matured with warming at 40° C. for 12 hours, whereby a fiber-reinforced resin sheet for molding 20 was produced.

The obtained sheet for molding 20 was such that the surface resin layer 26 of a beautifully colored condition appeared on one side and that the fiber-reinforced transparent resin layer 22 of a good transparent condition appeared on the reverse side. In between, there exists the fiber-reinforced colored resin layer 24, from which transference of a colorant to a surface layer part of the fiber-reinforced transparent resin layer 22 was not found.

Next, the sheet for molding a fiber-reinforced resin 20 was shaped. This sheet 20 was set at the opening hole part of the mold 10 kept at 90° C. so as to place the side of surface resin layer 26 on the side of the mold face 12, the circumference was fixed, the inside was exhausted under vacuum, the sheet 20 was absorbed into the mold to carry out shaping, and it was immediately irradiated with ultraviolet rays for 90 second using an ultraviolet rays lamp. At 20 minutes after shaping, when the mold was taken off and the covering film 30 was peeled off, the obtained molding 28 did not show any air-bubble invasion and undesired uneven irregularities, has an appearance which is flat and smooth and has a uniform color tone, and also, was superior in strength on both faces.

EXAMPLES 5

The procedure of example 4 was repeated except that the resin solution B was used as a resin solution for making the fiber-reinforced transparent resin layer 22, whereby the sheet for molding a fiber-reinforced resin 20 was produced.

Conditions of the sheet for molding 20 thus-obtained were excellent as in the example 4.

The molding of sheet for molding 20 was carried out similarly to that in the example 4 except that the period of time for irradiating ultraviolet rays was changed to 70 seconds, and a molding having good finish was obtained similarly to the case of example 4.

EXAMPLE 6

The procedure of example 4 was repeated except that the resin solution C was used as a resin solution for making the fiber-reinforced transparent resin layer 22, whereby the sheet molding a fiber-reinforced resin 20 was produced.

Conditions of the sheet for molding 20 thus-obtained were excellent as in the example 4.

The molding of sheet for molding 20 was carried out similarly to that in the example 4 except that a period of time for irradiating ultraviolet rays was changed to 50 seconds, and a molding having good finish was obtained similarly to the case of example 4.

EXAMPLE 7

In the example 4, the fiber-reinforced colored resin layer 24 was beforehand treated with the viscosity-thickening at 40° C. for 3 hours and then, the surface resin layer 26 was formed. But, in this example, the procedure of example 4 was repeated except that the viscosity-thickening treatment for the fiber-reinforced colored resin layer 24 was omitted, whereby the sheet for molding a fiber-reinforced resin 20 was produced. The conditions of thus-obtained sheet for molding 20 was excellent as in the example 4.

When the molding of sheet for molding 20 was carried out in the same manner to that in the example 4, the obtained molding, when compared with the molding obtained from the example 4, had none of invasion of air-bubbles and unnecessary uneven irregularities, showed an excellent outside appearance having a flat and uniform color tone, and was superior in strength on both faces, although a glass pattern was slightly seen on the surface of the surface resin layer 26.

Comparative Example 1

The covering film 34 was stuck on a flat and smooth stand, spacers similar to the aforementioned were placed on both the film's terminal ends, then the resin solution for a surface resin layer was supplied between the spacers, a glass rod laid across on the spacers was transferred along the spacers to make a surface of the resin solution flat and to remove an excess of the resin solution, whereby a surface resin layer 26 was formed. After viscosity-thickening at 40° C. for 3 hours, a fiber-reinforced colored resin layer 24 showing a glass content of about 30% was formed using one sheet of glass fiber mat and the resin solution for a fiber-reinforced colored resin layer. Next, at once, using two sheets of glass fiber mats and the resin solution B for a fiber-reinforced transparent resin layer, a fiber-reinforced transparent resin layer 22 showing a glass content of about 30% was laminated. At this stage, on a part of the fiber-reinforced transparent resin layer 22, was found a part in which the transparency was lost because of mingling of a colorant from the fiber-reinforced colored resin layer 24. Furthermore, on this, facilitate defoaming, a small amount of resin solution B for a fiber-reinforcing transparent resin layer was supplied, a covering film 30 was covered, and the defoaming treatment was carried out with a roller. Laminating of all the layers was carried out using a ditch-cutting, defoaming roller, according to usual procedure. The whole part of laminated sheets thus-obtained was matured with warming at 40° C. for 12 hours, whereby a fiber-reinforced resin sheet for molding 20 was produced. The conditions of the sheet for molding 20 thus-obtained was such that a beautiful surface resin layer 26 appears on one face, but a colorant of the fiber-reinforced colored resin layer 24 comes to and mingles with the fiber-reinforced transparent resin layer 22 on the reverse side and, as a result, transparency of the whole surface was lost.

When the molding of sheet for molding 20 was carried out in the same manner to that in the example 4, the covering film 30 covering the fiber-reinforced transparent resin layer 22 was broken at about 4 minutes after shaping. The molding 28 obtained was very nap-raising on a surface on the side of the fiber-reinforced transparent resin layer 22. When this result was compared with that of each of the examples, it is clear that the procedure has an advantage, which comprises forming at first the fiber-reinforced transparent resin layer 22 and, on this layer, then laminating the fiber-reinforced colored resin layer 24.

EXAMPLE 8

The sheet for molding a fiber-reinforced resin 20 was produced with the process shown in the above-described FIG. 3.

First, the covering film 34 stretched on a mold frame was placed on in contact with a flat and smooth stand and, spacers consisting of a silicon rubber belt of thickness 1 mm and width 10 mm were arranged on both terminal ends of an upper face of the stand. The resin solution for a surface resin layer was supplied on the covering film 34 between the spacers, then a glass rod laid on across the spacers was moved along the spacers to make the surface of the resin solution flat and to move an excess of the resin solution, whereby the surface resin layer 26 was formed. Furthermore, a covering film attaching to the surface resin layer was obtained by carrying out viscosity-thickening treatment at 40° C. for 3 hours.

Next, using two sheets of glass fiber mats and the resin solution A for the fiber-reinforced transparent resin layer, the fiber-reinforced transparent resin layer 22 having a glass content of about 30% was formed [refer to FIG. 3(a)]. On this layer, immediately, using one sheet of glass fiber mat and the resin solution for a fiber-reinforced colored resin layer, the fiber-reinforced colored resin layer 24 having a glass content of about 30% was laminated [refer to FIG. 3(b)]. The practical process for laminating each layer was carried out by an usual method and a ditch-cutting and defoaming roll was used.

On the fiber-reinforced colored resin layer 24, in order to facilitate defoaming, a small amount of resin solution for the fiber-reinforced colored resin layer was supplied and the previously-arranged covering film 34 attached to the surface resin layer 26 was covered so that the surface resin layer 26 overlapped with the fiber-reinforced colored resin layer 24 [refer to FIG. 3(c)]. This overlapping was carried out with attention so that air bubble was not rolled in between the surface resin layer 26 and the fiber-reinforced colored resin layer 24. Next, an excess of the resin was removed by a roll and defoaming was carried out. A laminating sheet obtained is matured at 40° C. for 12 hours to produce the sheet for molding a fiber-reinforced resin 20, on both faces of which the covering films 30 and 34 were stuck.

The obtained sheet for molding 20 was such that the surface resin layer 26 of a beautifully colored condition appeared on one side and that the fiber-reinforced transparent resin layer 22 of a good transparent condition appeared on the reverse side. In between, there exists the fiber-reinforced colored resin layer 24, from which transference of a colorant to a surface layer part of the fiber-reinforced transparent resin layer 22 was not found.

Next, the sheet for molding a fiber-reinforced resin 20 was shaped. This sheet 20 was set at the opening hole part of the mold 10 kept at 90° C. so as to place the side of surface resin layer 26 on the side of the mold face 12, the circumference was fixed, the inside was exhausted under vacuum, the sheet 20 was absorbed into the mold to carry out shaping, and it was immediately irradiated with ultraviolet rays for 90 seconds using an ultraviolet rays lamp. At 20 minutes after shaping, when the mold was taken off and the covering films 30 and 34 on both the sides were peeled off, the obtained molding 28 did not show any air-bubble invasion and undesired uneven irregularities, had an appearance which is flat and smooth and has a uniform color tone, and also, was superior in strength on both faces.

EXAMPLE 9

The procedure of example 8 was repeated except that the resin solution B was used as a resin solution for making the fiber-reinforced transparent resin layer 22, whereby the sheet for molding a fiber-reinforced resin 20 was produced.

Conditions of the sheet for molding 20 thus-obtained were excellent as in the example 8.

The molding of sheet for molding 20 was carried out similarly to that in the example 8 except that a period of time for irradiating ultraviolet rays was changed to 70 seconds, and a molding having good finish was obtained similarly to the case of example 8.

EXAMPLE 10

The procedure of example 8 was repeated except that the resin solution C was used as a resin solution for making the fiber-reinforced transparent resin layer 22, whereby the sheet for molding a fiber-reinforced resin 20 was produced.

Conditions of the sheet for molding 20 thus-obtained were excellent as in the example 8.

The molding of sheet for molding 20 was carried out similarly to that in the example 8 except that a period of time for irradiating ultraviolet rays was changed to 50 seconds, and a molding having good finish was obtained similarly to the case of example 8.

EXAMPLE 11

Using two sheets of glass fiber mats and the resin solution A for the fiber-reinforced transparent resin layer, the fiber-reinforced transparent resin layer 22 having a glass content of about 30% was formed on the covering film 30. On this layer, immediately, using one sheet of glass fiber mat and the resin solution for a fiber-reinforced colored resin layer, the fiber-reinforced colored resin layer 24 having a glass content of about 30% was laminated.

Until this stage, the process carried out was the same to that shown in FIG. 3 (a) and 3 (b) in the example 8.

Next, spacers similar to those used in the example 8 were arranged on both terminal ends of the upper face of the fiber-reinforced colored resin layer 24. The resin solution for the surface resin layer was supplied on the fiber-reinforced colored resin layer 24 between the spacers and then, a glass rod laid across the spacers was moved along the spacers to make the surface of the resin solution flat and to remove an excess of the resin solution, whereby the surface resin layer 26 was formed. The laminated sheet obtained was matured at 40° C. for 12 hours, whereby the sheet for molding a fiber-reinforced resin 20 was produced.

The obtained sheet for molding 20 showed such conditions that the surface in a side of the fiber-reinforced transparent resin layer 22 was similar to that of the example 8, but uneven irregularities were formed on the surface in a side of the surface resin layer 26.

When the sheet for molding 20 was molded similarly to the case of example 8, there were found uneven irregularities formed on the surface in a side of the surface resin layer 26. From these results, there is a clear advantage in the process that the surface resin layer 26 is first formed and treated with viscosity-thickening and then, laminated with the fiber-reinforced colored resin layer.

What is claimed is:

1. A sheet for forming a fiber-reinforced resin molding, by shaping the sheet along a mold face and molding by thermic curing, comprising: a laminate of
   (a) a fiber-reinforced resin layer;
   (b) a colored surface resin layer;
   said fiber-reinforced resin layer having a fiber-reinforced colored resin layer therein, adjacent to and colored in a color similar to that of said colored surface resin layer; and
   (c) a fiber-reinforced transparent resin layer, on the surface of said fiber reinforced resin layer opposite said colored surface resin layer, said fiber-reinforced transparent resin layer being curable by ultraviolet rays.

2. A sheet for molding a fiber-reinforced resin as claimed in claim 1, wherein a fiber content of the fiber-reinforced colored resin layer is 40% by weight or more.

* * * * *

UNITED STATES PATENT AND TRADEMARK OFFICE
CERTIFICATE OF CORRECTION

PATENT NO. : 5,234,756
DATED : August 10, 1993
INVENTOR(S) : KOHAMA et al.

It is certified that error appears in the above-indentified patent and that said Letters Patent is hereby corrected as shown below:

Cover page, Item [73], line 2, "Nippon Shobubai Co.," should read -- Nippon Shokubai Co.,--.

Signed and Sealed this

Sixth Day of September, 1994

Attest:

BRUCE LEHMAN

Attesting Officer

Commissioner of Patents and Trademarks